Patented Apr. 13, 1926.

1,580,710

UNITED STATES PATENT OFFICE.

CHARLES I. CHUBBUCK, OF SAN FRANCISCO, CALIFORNIA.

METHOD OF MANUFACTURING HYDRATED LIME.

No Drawing. Application filed February 28, 1924. Serial No. 695,812.

*To all whom it may concern:*

Be it known that I, CHARLES I. CHUBBUCK, a citizen of the United States, residing at the city and county of San Francisco and State of California, have invented new and useful Improvements in Methods of Manufacturing Hydrated Lime, of which the following is a specification.

This invention relates to a method of manufacturing a dry hydrated lime; the object being to obtain a lime which will produce a smooth, adhesive, plastic putty or mortar, comparable, if not superior, to the putty or mortar produced directly from quick lime when slaked in one operation.

Practically all hydrated lime sold on the market at the present time is manufactured by the following method with slight variations:

(1) The lump quick lime is ground to a fairly uniform small size.

(2) The powder or grains resulting therefrom are thoroughly mixed with sufficient water to slake the lime into a fine dry powder.

(3) The powder is then screened and bagged, and as such is ready for the market.

With limes having a high calcium content it takes about 55 pounds of water to slake 100 pounds of lime to a dry powder.

With lime containing magnesium it takes about 30 pounds of water to slake 100 pounds of lime to a dry powder.

When lime is hydrated in this manner a great deal of heat is generated; the temperature usually ranging from 300° F. to 900° F. This high temperature produced apparently changes the physical characteristics of the lime as putty or mortar produced therefrom is inferior to putty or mortar produced directly from quick lime in one operation; that is, lime produced by the above mentioned process loses a certain amount of its plastic and adhesive qualities, and furthermore, is more or less grandular in formation.

The purpose of the present invention is to produce a dry lime which when made into a putty or mortar will retain all of the good or desirable qualities of putty or mortar produced directly from quick lime in one operation; this being accomplished by hydrating the lime in an abundance of water and by maintaining low temperatures during the slaking or hydrating operation. The method of producing the lime is substantially as follows:

(1) I slake either lump or crushed quick lime by hand or in a slaking machine and produce a flowing putty by adding an excess of water; the putty containing from 50 to 90 per cent of water, depending upon the character of the lime, care being at the same time taken to maintain such a water content that the temperature will not materially exceed the temperature of boiling water maintained under atmospheric pressure, to-wit, approximately 212° F.

(2) The flowing putty is then immediately run through a screen or classifier to remove any impurities contained.

(3) The hot putty is then delivered to a continuous or batch filter of any suitable character, which removes most of the excess water, thereby producing a stiff paste of lime putty containing from 25 to 40 per cent water.

(4) The water removed by the filter is pumped back to the slaking machine and as such may be used over and over again.

(5) The stiff lime putty is next conveyed to a bin where hydration is completed. The heat produced in the bin during the remaining period of the slaking or hydration operation will evaporate the remaining water, thus producing a dry hydrated lime. With some limes, however, it will be necessary to add a small amount of finely ground quick lime to increase the temperature sufficiently to drive off the water, but where this is not desirable drying may be resorted to by applying artificial heat. The lime thus produced retains all the desirable qualities of lime putty obtained by slaking quick lime in one operation as it is both smooth, adhesive and plastic.

Having thus described my invention, what I claim and desire to secure by Letters Patent is—

A method of manufacturing hydrated lime, which consists in slaking quick-lime in an excess of water to a flowing putty, removing the major portion of the water before the slaking operation is completed, then completing the slaking operation with the remaining water, and utilizing the heat generated by the last slaking operation to evaporate excess water.

CHARLES I. CHUBBUCK.